(12) United States Patent
Elsik et al.

(10) Patent No.: US 11,905,981 B2
(45) Date of Patent: Feb. 20, 2024

(54) HYDRAULIC ACCUMULATOR AUTOSTART

(71) Applicant: GJR Meyer Service, Inc., Corpus Christi, TX (US)

(72) Inventors: Gary Michael Elsik, Corpus Christi, TX (US); Noel Donavan McKim, Corpus Christi, TX (US); Frank Michael Gonzalez, Corpus Christi, TX (US)

(73) Assignee: GJR Meyer Service, Inc., Corpus Christi, TX (US)

( * ) Notice: Subject to any disclaimer, the term of this patent is extended or adjusted under 35 U.S.C. 154(b) by 0 days.

(21) Appl. No.: 18/310,080

(22) Filed: May 1, 2023

(65) Prior Publication Data

US 2023/0349403 A1    Nov. 2, 2023

Related U.S. Application Data

(60) Provisional application No. 63/363,955, filed on May 1, 2022.

(51) Int. Cl.
*F15B 21/04* (2019.01)
*F15B 21/048* (2019.01)

(52) U.S. Cl.
CPC ........ *F15B 21/048* (2013.01); *F15B 2201/51* (2013.01); *F15B 2211/205* (2013.01)

(58) Field of Classification Search
CPC .. E02F 9/2217; F15B 21/048; F15B 2201/51; F15B 2211/205
See application file for complete search history.

(56) References Cited

U.S. PATENT DOCUMENTS

| | | | |
|---|---|---|---|
| 7,908,852 B2* | 3/2011 | Zhang | E02F 9/2228 91/454 |
| 2009/0241534 A1* | 10/2009 | Tikkanen | F15B 1/024 60/413 |
| 2013/0098012 A1* | 4/2013 | Opdenbosch | F15B 1/024 60/413 |

* cited by examiner

*Primary Examiner* — Abiy Teka
(74) *Attorney, Agent, or Firm* — Ramey LLP

(57) ABSTRACT

A system for automatically actuating a hydraulic accumulator—useful for oil collection systems—capable of operation while maintaining a zero or near zero draw of electrical energy.

15 Claims, 4 Drawing Sheets

HYDRAULIC ACCUMULATOR AUTOSTART

CROSS-REFERENCE TO RELATED APPLICATION

This application claims priority benefit of US Provisional Application No. 63/363,955, entitled 'Hydraulic Accumulator AutoStart,' which was filed on May 1, 2022, the contents of which are entirely incorporated herein.

BACKGROUND OF THE INVENTION

Field of the Invention

The present invention relates generally to systems for maintaining hydraulic pressure and relates particularly to systems and methods to maintain hydraulic pressure in fluidic systems having little to no parasitic current when not actively operational.

Description of the Related Art

Hydraulic accumulators provide power to rapidly close or open pressure valves on a rig site. Generally, the valves connected to hydraulic accumulators are critical for the safety of a well site. Such valves can include the blowout preventer and frac valves during tracing operations. Hydraulic accumulators operate by storing hydraulic pressure in tanks wherein a biasing system maintains the hydraulic fluid under pressure. Attempts to provide systems that maintain the pressure in such hydraulic fluids have not, however, been wholly successful.

Thus, there is room for improvement in the art.

SUMMARY OF THE INVENTION

A hydraulic accumulator is a vessel that stores hydraulic pressure required to close the blowout preventer at a rig site if a blowout occurs. The amount of pressure required varies depending on the type of blowout preventer. In an embodiment of the present invention an engine drives a hydraulic pump that pumps hydraulic fluid into the hydraulic accumulator/s. As the hydraulic fluid pressure increases a first mechanical switch (or electronic pressure switch or pressure transducer) monitors the hydraulic fluid pressure and shuts off the system when the hydraulic fluid pressure reaches an upper threshold.

Once the hydraulic fluid pressure drops to a lower threshold, a second mechanical pressure switch (or electronic pressure switch or transducer) will make a mechanical connection that allows a power source such as a time, capacitor bank, logic controller or battery to depressurize the hydraulic pump and then activate the start circuit on a diesel or other engine. As the engine starts, a sensor on the engine sends a control signal which keeps a circuit closed maintaining power to the system. If needed, the fluid circuit that was used to depressurize any hydraulic fluid pressure in the pump is closed so that the pump can now begin to re-pressurize the system. Once the hydraulic fluid pressure reaches the upper threshold the first mechanical pressure switch again shuts the system off until such time as the lower hydraulic fluid pressure in again reached.

Additionally, sensors to monitor voltage may be incorporated into the system. These sensors can be used to trigger a charge cycle to replenish the battery before the battery voltage drops below a critical threshold.

An embodiment of this disclosure includes a system for maintaining hydraulic pressure at a hydraulic accumulator, the system comprising: a pressure sensor electrically coupled to a control unit; a check valve hydraulically coupled to the pressure sensor through a first hydraulic connector; a pump hydraulically coupled to the check valve through a second hydraulic connector and electrically coupled to the control unit; the pressure sensor configured to mechanically detect a pressure at the first hydraulic connector; the pressure sensor further configured to transmit an electrical signal to the control unit when the pressure at the first hydraulic connector falls below a first threshold, and wherein the control unit is configured to control the pump to urge, at a first time, hydraulic fluid through the check valve into the first hydraulic connector through a second hydraulic connector when the control unit receives the electrical signal.

Another embodiment of this disclosure includes a method for maintaining pressure in a hydraulic accumulator, the method comprising: providing a pressure sensor electrically coupled to a control unit; providing a check valve hydraulically coupled to the pressure sensor through a first hydraulic connector; providing a pump hydraulically coupled to the check valve through a second hydraulic connector and electrically coupled to the control unit; mechanically detecting, using the pressure sensor, a pressure at the first hydraulic connector; transmitting, using the pressure sensor, an electrical signal to the control unit when the pressure at the first hydraulic connector falls below a first threshold; receiving, by the control unit, the electrical signal; and controlling the pump, using the control unit, to urge, at a first time, hydraulic fluid through the check valve into the first hydraulic connector through a second hydraulic connector responsive to the control unit receiving the electrical signal.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Hydraulic accumulators provide power to rapidly close or open particular valves on the rig site. Generally, the valves connected to hydraulic accumulators are critical for the safety of a well site. Such valves include the blowout preventor and frac valves during tracing operations. Hydraulic accumulators operate by storing hydraulic pressure in tanks—the accumulator—where some kind of biasing system maintains the hydraulic fluid under pressure using pressurized gas or springs, etc. In any case the hydraulic fluid must be pumped into the accumulator and overcomes the force of the bias system. As more fluid is pumped into the accumulator the higher the pressure becomes. Over time the pressure in the accumulator drops due to leaks, etc. in the system. Because it is critical that the pressure in the accumulator is maintained between an upper and lower limit, systems have been devised that monitor the pressure and typically utilize an engine or motor to drive a pump to re-pressurize the system.

Unfortunately, such systems tend to remain dormant for extended periods of time and due to constant if small parasitic electrical drains from the monitoring computer, the electric pressure sensors, etc., the system may not have sufficient power to start or drive the engine or motor powering the hydraulic pump leading to a dangerous system where the accumulators lack the necessary pressure to activate the various valves in an emergency.

In an embodiment of the present invention an engine drives a hydraulic pump that pumps hydraulic fluid into the accumulator/s. As the hydraulic fluid pressure increases a first mechanical pressure switch monitors the hydraulic fluid pressure and shuts off the system when the hydraulic fluid pressure reaches an upper threshold.

Once the hydraulic fluid pressure drops to a lower threshold, a second mechanical pressure switch will make a mechanical connection that allows a power source such as a capacitor bank or battery to depressurize the hydraulic pump and then activate the start circuit on a diesel or other engine. As the engine starts an engine oil pressure switch in the engine senses the engine's oil pressure and keeps a circuit open to allow the engine to continue to run. If needed the fluid circuit that was used to depressurize any hydraulic fluid pressure in the pump is closed so that the pump can now begin to re-pressurize the system. Once the hydraulic fluid pressure reaches the upper threshold the first mechanical pressure switch again shuts the system off until such time as the lower hydraulic fluid pressure in again reached.

Figure 1:
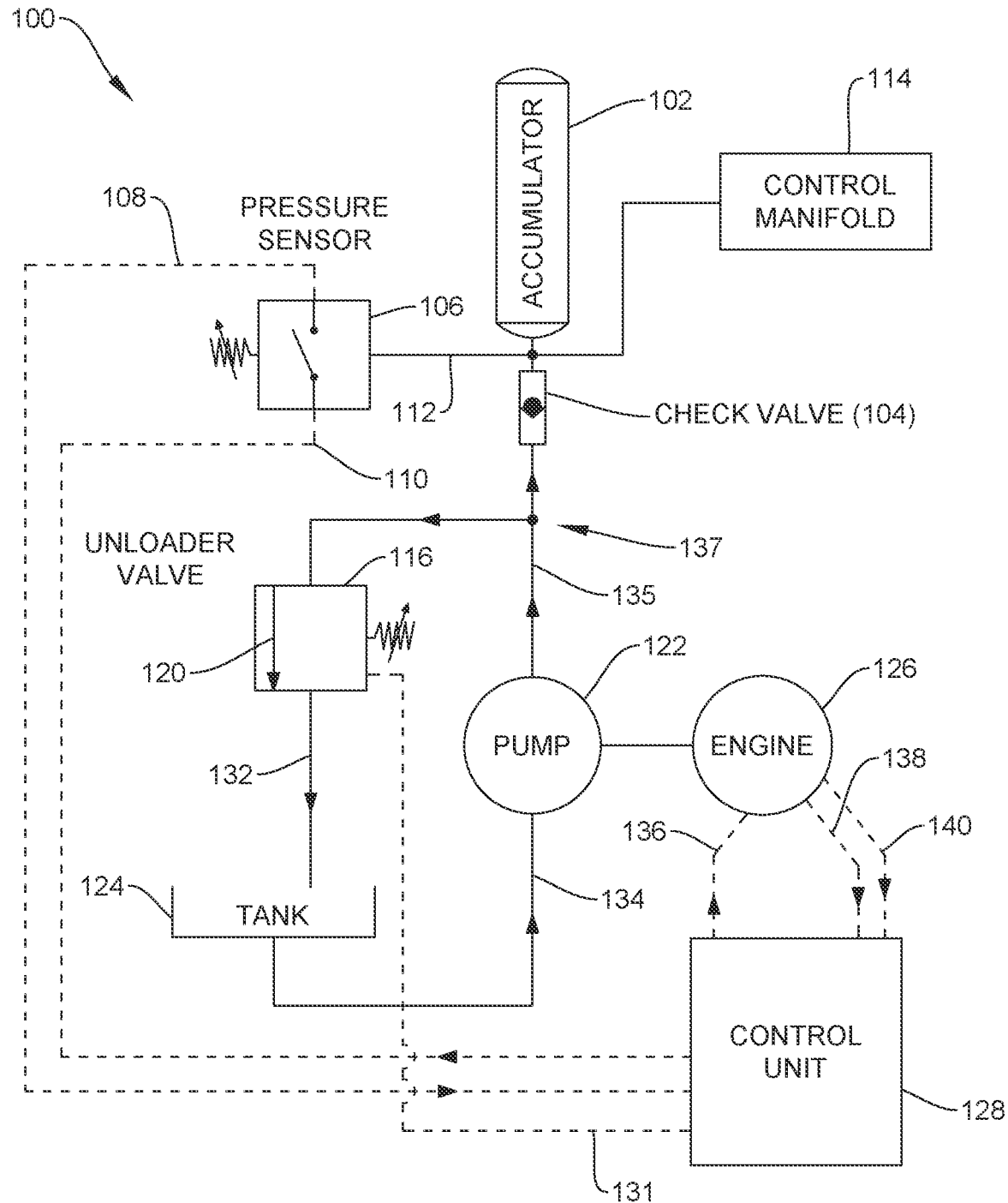
FIG. 1 illustrates a system for maintaining pressure in a hydraulic accumulator, in accordance with a first embodiment of this disclosure.

FIG. 1 shows a first system 100 in accordance with an embodiment of this disclosure. The system 100 includes a hydraulic accumulator 102, a check valve 104, and a pressure sensor 106. In at least one embodiment, hydraulic accumulator 102 serves as a pressure reservoir used to maintain pressure at a well head, frac valve or blowout preventer (not shown) within a desired range. The hydraulic accumulator 102 is connected to a pressure regulator (not shown) which regulates the pressure at the well head, frac valve or blowout preventer or other component requiring pressure maintenance.

In conventional systems, the engine control unit (212) is powered constantly in order to keep the system 100 ready to provide pressure. It is one advantage of one or more embodiments of this disclosure that the system 100 does not drain current in order to maintain the system 100 in a ready state.

In at least one embodiment, the system 100 includes a voltage sensor (not shown) which senses the voltage at the battery (250). When the voltage at the battery (250) falls below a predetermined level, the control unit 128 will cause the unloader valve 116 to remain open while the engine 126 runs so as to recharge the battery. Once the battery (250) is sufficiently charged, the engine 126 will be shut off by the control unit.

In at least one embodiment, pressure sensor 106 is a pressure switch. In at least one embodiment, pressure sensor 106 is a pressure transducer. The system 100 also includes a control manifold 114, an unloader valve 116, and a tank 124. Additionally, the system 100 includes a hydraulic pump 122, an engine 126, and a control unit 128. Pressure sensor 106 sends signal 108 to control unit 128. Control unit 128 outputs signal 110 to pressure sensor 106. Connective line 112 connects pressure sensor 106 to hydraulic accumulator 102, control manifold 114, and check valve 104. When connective line 112 is in a steady state, the hydraulic pressure is uniform throughout connective line 112. During normal operation of the system 100, the hydraulic pressure within the hydraulic accumulator 102 will be substantially equal to the pressure in line 112. When the pressure in the hydraulic accumulator 102 and the pressure in line 112 fall below a predetermined value, the pressure sensor 106 transmits signal 108 to the control unit 128. Signal 110 from control unit 128 to the pressure sensor 106 is a voltage supply to the pressure sensor 106. Signal 108 is a return signal from the pressure sensor 106 to the control unit 128 which is transmitted when the pressure sensor 106 detects that the pressure in line 112 (and thus in the hydraulic accumulator 102) is too low. In at least one embodiment, line 112 represents a signal indicative of the pressure at the near end of hydraulic accumulator 102. When the signal corresponding to the pressure in line 112 indicates a pressure falling below a predetermined threshold, the pressure sensor 106 transmits control signal 108 to the control unit 128.

In at least one embodiment, engine 126 is electrically powered. In at least one embodiment, engine 126 is gasoline powered. In at least one embodiment, engine 126 is diesel powered.

If the pressure in the hydraulic accumulator 102 drops below the predetermined recharge point, pressure sensor 106 will send control signal 108 to control unit 128. In at least one embodiment, control signal 108 corresponds to a modulated version of voltage signal 110. Based on signal 108 (as well as the position of one or more switches, see FIGS. 2-3), control unit 128 will send one or more control signals (e.g., signal 136) to engine 126 causing the engine to start. The engine 126 will drive the pump. The engine 126 will also communicate back to the control unit 128 with one or more signals (e.g., 138, 140) corresponding to information such as engine speed and engine temperature.

The control unit 128 is configured to control the engine 126 (using signals such as signal 136) and the unloader valve 116 based on engine output signals 138, 140. In at least one example, when the pressure in line 112 reaches an upper threshold, pressure sensor 106 will stop sending signal 108 to the control unit 128 which will cause control unit 128 to cause the engine 126 to stop, which will in turn cause the pump 122 to stop pumping. The pump 122 pressurizes the fluid in hydraulic connector 134 coining from the tank 124 to the pump. When the unloader valve 116 is open, the unloader valve 116 permits fluid 135 being pumped from the pump 122 to flow through hydraulic connector 132 to tank 124, the direction of flow through the unloader valve 116 being indicated by arrow 120.

In at least one embodiment of this disclosure, a disparity in the rate of flow 132 out of unloader valve 116 into tank 124 and the rate of flow in hydraulic connector 134 out of the tank 124 (and the corresponding pressures of flows in hydraulic connector 132 and hydraulic connector 134) means that the pump 122 is effectively able to begin pumping at a lower pressure and gradually increase the pressure in flow 135 into check valve 104, with excess pressure at flow 135 being released by unloader valve 116 until the pressure at line 112 is raised to an appropriate level (as flow 135 is passed in only one direction across check valve 104). The unloader valve 116 will, under normal operating conditions, be open when the pump 122 starts, to prevent the pump 122 from starting in a locked state. When the unloader valve 116 is closed, fluid does not escape line 137 through the unloader valve 116. When the pressure at line 112 reaches a desired value, pressure sensor 106 sends a signal 108 to the control unit 128 which shuts the engine 126 off and the pump 122 off and causes unloader valve 116 to open via signal 131.

In at least one embodiment, the unloader valve 116 will close immediately when the control unit 128 is actuated to increase the pressure at the hydraulic accumulator 102. In at least one embodiment, the unloader valve 116 will be closed gradually to enable the engine 126 to increase the pressure at the hydraulic accumulator 102 more gradually than would otherwise be the case.

Figure 2:
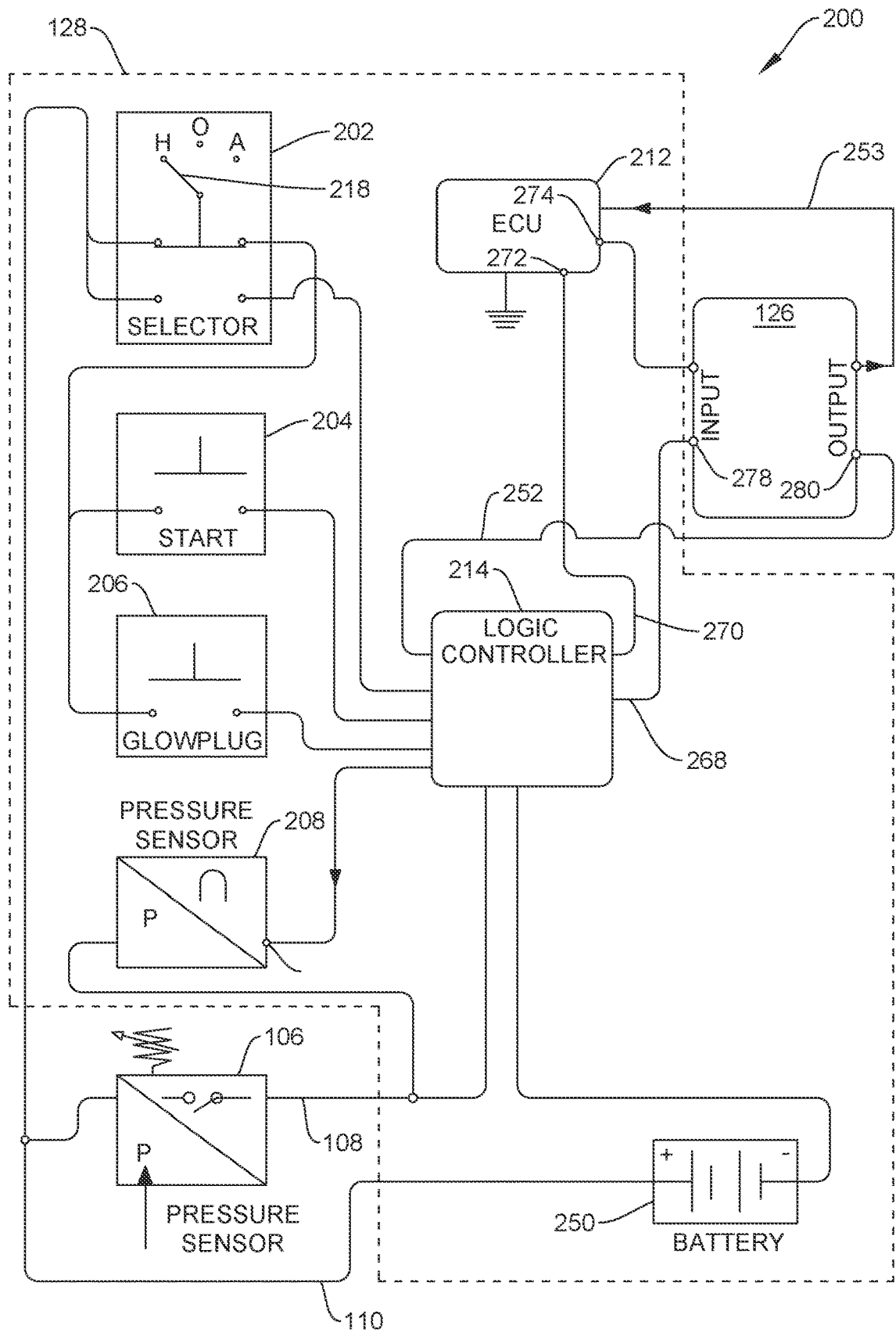
FIG. 2 illustrates a system for maintaining pressure in a hydraulic accumulator, in accordance with a second embodiment of this disclosure.

FIG. 2 shows a second system 200 (e.g., 100) in accordance with an example of this disclosure. The system 200 includes engine 126 (see FIG. 1), a control unit 128 (see FIG. 1), and a mainline pressure sensor 106. The control unit 128 includes a selector unit 202, a manual activation switch 204, a glowplug 206, and a secondary oil pressure sensor 208. The control unit 128 further includes an engine control unit 212, a logic controller 214, and a storage battery 250. In at least one embodiment of this disclosure, the logic controller 214 resides on a microchip. In some embodiments, the logic controller 214 is a programmable logic device. In some embodiments, the logic controller 214 resides on an integrated circuit. In at least one example, battery 250 corresponds to another power source. In at least one example, battery/power source 250 supplies twelve volts to the circuit formed by the remaining components in system 200.

Signals emanating from the logic controller 214 include signal 268 which is received at port 278 at of the engine. Signal 268 represents a signal to start the engine 126 or the like. Logic controller 214 sends power signal 270 to the which is received at port 272 of engine control unit 212. Logic controller 214 sends power to the engine control unit. In at least some embodiments and depending on the programming of the engine control unit 212, the logic controller 214 will send speed requests to the engine control unit 212. The logic controller 214 can send out signal 268 for start circuit 204 and/or glowplug circuit(s) 206 and/or accessory power to a motor and/or fuel shutdown solenoids (not shown). In the embodiment illustrated in FIG. 2, the engine control unit 212 is connected to ground.

The engine will send output signal(s) 252 from port 280 to the logic controller 214. The engine can send signal 253 to engine control unit 212. Signal and signal 253 can be indicative of voltage on the system 200 and/or engine speed and/or engine oil temperature and/or other engine diagnostic parameters and/or charging voltage and/or supply voltage. The engine control unit 212 and/or the logic controller 214 are configured to vary engine parameters and/or shut down the engine based on signal 252 and/or signal 253.

In at least one embodiment, pressure sensor 106 eliminates parasitic drain from the battery/power source 250 by shutting down all unnecessary components when the engine is not running. In so doing, the pressure sensor 106 helps to ensure the battery will have power sufficient to start the engine when needed to repressurize the hydraulic accumulator (102).

As explained with respect to FIG. 1, when pressure sensor 106 detects that the pressure at the hydraulic accumulator (102) is undesirably low, pressure sensor 106 sends signal 108 to the logic controller 214 to initiate a start cycle (turn on the engine). As also explained with respect to FIG. 1, when pressure sensor 106 detects that the pressure at the hydraulic accumulator (102) is adequately high, pressure sensor 106 sends signal 108 to the logic controller 214 to stop the engine 126 and open the unloader valve (116).

In at least one embodiment, glowplug 206 is a manual pushbutton or switch or other operator interface that communicates to the logic controller 214 to run through a glowplug cycle before starting. In at least one embodiment, the logic controller 214 would initialize a glowplug cycle based on temperature input or a logic controller input. Such glowplug cycle (not shown) would be triggered through a relay (not shown) though an output signal such as signal 268. Start switch 204 is an operator interface. Starter switch 204 and glowplug 206 can initialize the logic controller 214 to start the engine or initiate a glowplug cycle only when switch 218 in selector 202 is set to 'H.' The pressure sensor 106 will transmit signal 108 when the pressure sensor 106 detects that the pressure at the hydraulic accumulator (102) is too low only when the switch 218 is set to 'A.' In both cases, the logic controller 214 will stop the pump and open the unloader valve (116) once the desired pressure in line (112) has been reached.

In some embodiments, pressure sensor 208 is configured to detect engine oil pressure that would continue to keep an accessory energized.

Figure 3:
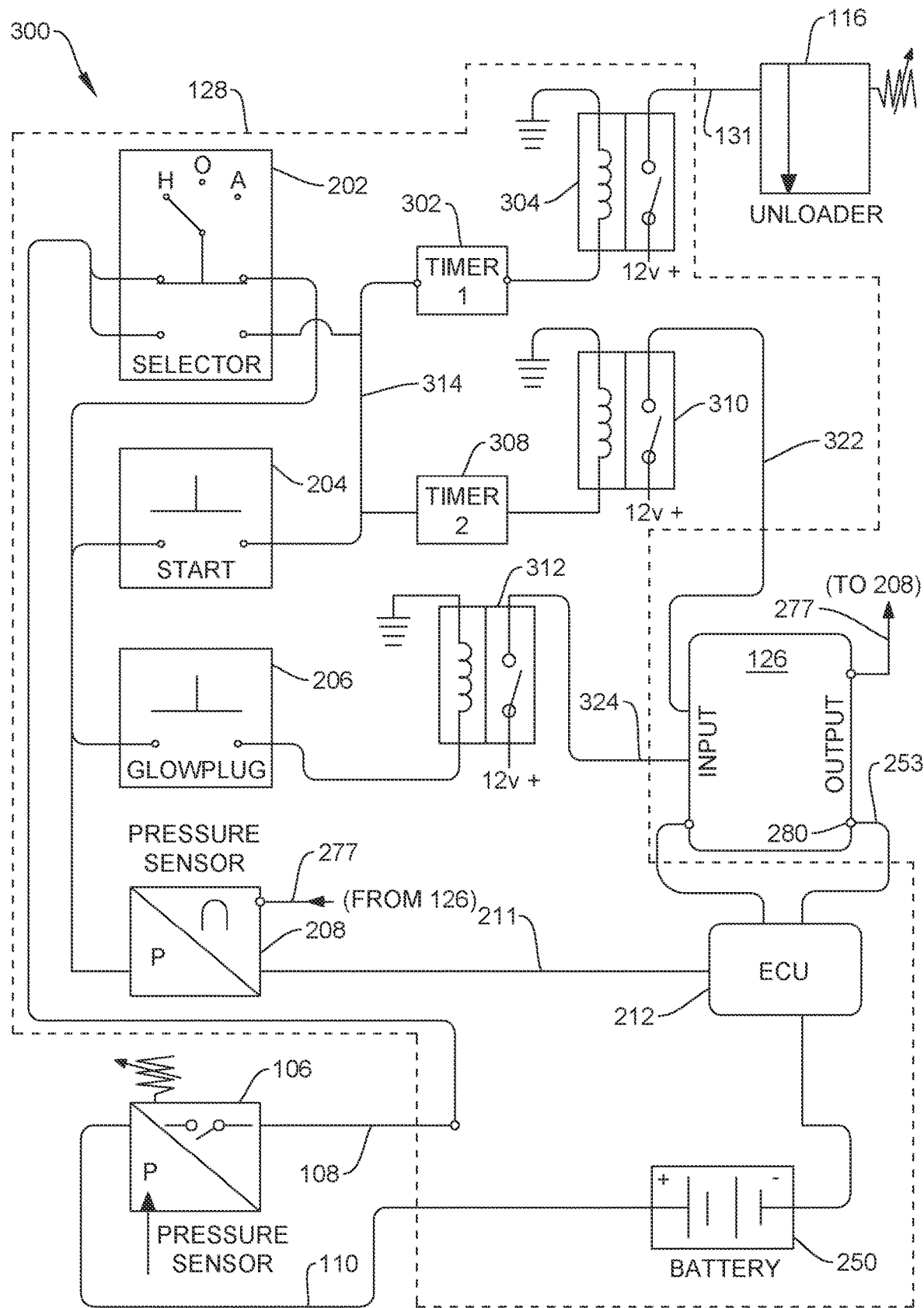
FIG. 3 illustrates a system for maintaining pressure in a hydraulic accumulator, in accordance with a third embodiment of this disclosure.

FIG. 3 shows a third system 300 (e.g., 100, 200) in accordance with an example of this disclosure. The system 300 includes a control unit 128 (see FIGS. 1 and 2), an engine 126 (see FIGS. 1 and 2), a mainline pressure sensor 106, and an unloader valve 116 (see FIGS. 1 and 2).

The system 300 includes a selector 202, a start button/switch 204, a glowplug 206 and an oil pressure sensor 208. The system 300 also includes a first timer 302 connected to a first relay 304, a second timer 308 connected to a second relay 310, and a glowplug switch 206 connected to a third relay 312. In at least one embodiment, start button 204 will activate the first timer 302 to trip relay 304, and relay 304 will energize the unloader valve 116—through signal 131—to close after a first predetermined amount of time; the start button 204 will simultaneously activate the second timer 308 to trip relay 310, and relay 310 will energize the starter on the engine 126 for a second predetermined amount of time through signal 322. The second predetermined amount of time will be less than the first predetermined amount of time. Thus, the unloader valve 116 will close only after the engine 126 has run for a time.

Glowplug 206 is connected to relay 312. Glowplug is manually operated. If for example, the glowplug switch 206 is closed for five seconds, the glowplug 206 will be energized for five seconds. The power for the glowplug 206 comes through the battery/power source 250 through signal 110 when the switch in pressure sensor 106 closes, the closing sends power to pressure switch 208 and to the selector 202. When the selector switch 218 is set to the hand mode (as shown in FIG. 3), power signal 108 is relayed to starter switch 204 and glowplug 206. If the selector 202 is in auto mode, the pressure sensor 106 will send power to oil pressure sensor 208 and to the selector 202 and to energize first timer 302 and second timer 308 through signal 314.

As explained, when signal 322 is received by the engine, the engine will start. When signal 324 is received by the engine 126, the engine 126 will operate in glowplug mode, meaning that a glowplug or other heating device (such as a heating element) will be activated to ensure that engine lubricant is warm enough to lubricate the engine. Pressure line 277 from the engine 126 to pressure sensor 208 corresponds to the oil pressure in the engine 126. That is, pressure sensor 208 senses the oil pressure in engine via line 277.

When pressure sensor 208 determines that the oil pressure in the engine 126 is in a proper range, the pressure sensor 208 transmits signal 211 to the engine control unit 212 which keeps the engine 126 running. As discussed with regard to FIG. 2, output port 274 on the engine control unit 212 is connected to the engine 126, and output port 280 on the engine 126 is configured to send signal 253 to the engine control unit 212.

Under normal circumstances, the system 300 to repressurize the hydraulic accumulator (102) will be run for less than ten minutes a few times each day. Alternatively, the system 300 will need to be run for a few minutes every few days. It is advantageous to minimize current drawn from the battery 250 by having pressure sensor 106 be a mechanical device. Power is drawn from the battery 250 only when the switch of the mechanical pressure sensor 106 closes and enables current signal 108 to pass to the control unit 128. Pressure sensor 106 itself does not draw power.

Figure 4:
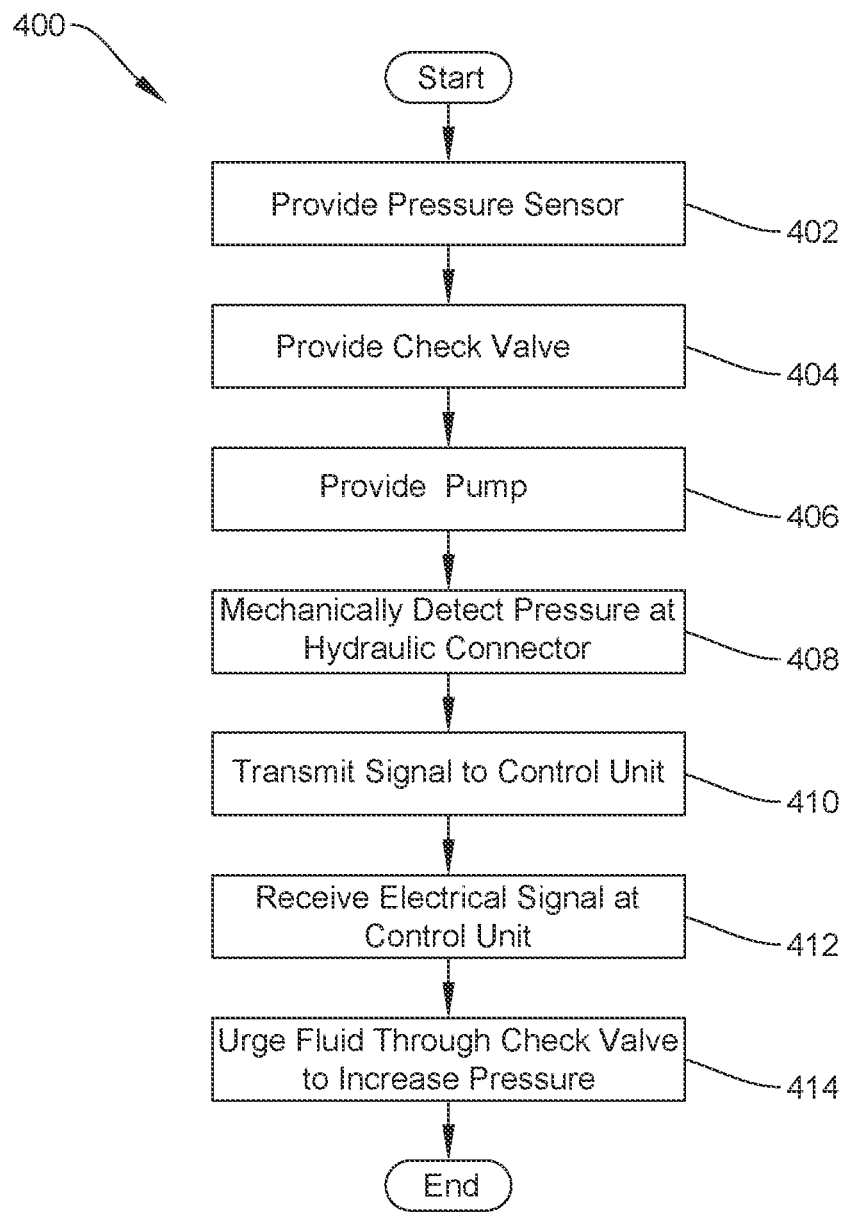
FIG. 4 illustrates a method of operating a system for maintaining hydraulic pressure, in accordance with an embodiment of this disclosure.

FIG. 4 illustrates a method 400 for maintaining pressure in a hydraulic accumulator (e.g., 102). The method 400 includes providing 402 a pressure sensor (106) electrically coupled to a control unit (128) and providing 404 a check valve (104) hydraulically coupled to the pressure sensor (106) through a first hydraulic connector (112). The method also includes providing 406 a pump (122) which is hydraulically coupled to the check valve (104) through a second hydraulic connector and electrically coupled to the control unit (128). Additionally, the method 400 includes mechanically detecting 408, using the pressure sensor (106), a pressure at the first hydraulic connector (112). Thereafter, the pressure sensor (106) transmits 410 an electrical signal (108) to the control unit (128) when the pressure at the first hydraulic connector (112) falls below a first threshold. The control unit (128) then receives 412 the electrical signal (108). The method 400 thereafter involves controlling 414 the pump (122), using the control unit (128), to urge, at a first time, hydraulic fluid through the check valve (104) into the first hydraulic connector (112) through a second hydraulic connector (137) responsive to the control unit (128) receiving the electrical signal (108).

Embodiments of the invention include the following examples:

A system (100, 200, 300) for maintaining hydraulic pressure at a hydraulic accumulator (102), the system (100, 200, 300) comprising: a pressure sensor (106) electrically coupled to a control unit (128); a check valve (104) hydraulically coupled to the pressure sensor (106) through a first hydraulic connector (112); a pump (122) hydraulically coupled to the check valve (104) through a second hydraulic connector and electrically coupled to the control unit (128); the pressure sensor (106) configured to mechanically detect a pressure at the first hydraulic connector (112); the pressure sensor (106) further configured to transmit an electrical signal (108) to the control unit (128) when the pressure at the first hydraulic connector (112) falls below a first threshold, wherein the control unit (128) is configured to control the pump (122) to urge, at a first time, hydraulic fluid through the check valve (104) into the first hydraulic connector (112) through a second hydraulic connector (137) when the control unit (128) receives the electrical signal (108).

2. The system (100, 200, 300) of example 1, wherein the pressure sensor (106) is further configured to cease transmitting the electrical signal (108) to the control unit (128) when the pressure at the first hydraulic connector (112) exceeds a second threshold.

3. The system (100, 200, 300) of example 2, wherein the control unit (128) is further configured to control the pump (122) to cease urging hydraulic fluid through the check valve (104) into the first hydraulic connector (112) through the second hydraulic connector (137) when the control unit (128) stops receiving the electrical signal (108).

4. The system (100, 200, 300) of example 2, wherein the second threshold is at least two thousand pounds per square inches greater than the first threshold.

5. The system (100, 200, 300) of example 2, further comprising: an engine (128); and a rechargeable battery (250), wherein the engine (128) is electrically coupled to the rechargeable battery (250) and operably coupled to the pump (122), and wherein the electrical signal (108) is based on a voltage signal (110) from the rechargeable battery (250).

6. The system (100, 200, 300) of example 5, wherein the electrical signal (108) is a modulated signal (108) based on the voltage signal (110) and modulated by the pressure sensor (106).

7. The system (100, 200, 300) of example 1, further comprising a hydraulic accumulator (102) hydraulically coupled to the pressure sensor (106) and the check valve (104) through the first hydraulic connector (112).

8. The system (100, 200, 300) of example 1, further comprising: an unloader valve (116) hydraulically connected to the pump (122) through the second hydraulic connector (137) and electrically coupled to the control unit (128); a tank (124) hydraulically connected to the unloader valve (116) through a third hydraulic connector (132) and hydraulically connected to the pump (122) through a fourth hydraulic connector (134), wherein the control unit (128) is configured to close the unloader valve (116) at a second time, and wherein the second time is subsequent to the first time.

9. The system (100, 200, 300) of example 8, wherein the control unit (128) is further configured to control the unloader valve (116) to reduce a rate at which the unloader valve (116) transmits fluid received through the second hydraulic connector (137) to the tank (124) through the third hydraulic connector (132) over a period commencing at a third time and ending at the second time.

10. The system (100, 200, 300) of example 9, wherein the third time is later than the first time.

11. A method (400) for maintaining pressure in a hydraulic accumulator (102), the method (400) comprising: providing a pressure sensor (106) electrically coupled to a control unit (128); providing a check valve (104) hydraulically coupled to the pressure sensor (106) through a first hydraulic connector (112); providing a pump (122) hydraulically coupled to the check valve (104) through a second hydraulic connector and electrically coupled to the control unit (128); mechanically detecting, using the pressure sensor (106), a pressure at the first hydraulic connector (112); transmitting, using the pressure sensor (106), an electrical signal (108) to the control unit (128) when the pressure at the first hydraulic connector (112) falls below a first threshold; receiving, by the control unit (128), the electrical signal (108); and controlling the pump (122), using the control unit (128), to urge, at a first time, hydraulic fluid through the check valve (104) into the first hydraulic connector (112) through a second hydraulic connector (137) responsive to the control unit (128) receiving the electrical signal (108).

12. The method (400) of example 11, ceasing, using the pressure sensor (106) transmission of the electrical signal (108) to the control unit (128) when the pressure at the first hydraulic connector (112) exceeds a second threshold.

13. The method (400) of example 12, further comprising ceasing, by the pump (122) to urge hydraulic fluid through the check valve (104) into the first hydraulic connector (112) through the second hydraulic connector (137) responsive the control unit (128) detecting that the control unit (128) has stopped receiving the electrical signal (108).

14. The method (400) of example 12, wherein the second threshold is at least two thousand pounds per square inches greater than the first threshold.

15. The method (400) of example 12, further comprising: providing an engine (128); providing a rechargeable battery (250); and electrically coupling the engine (128) to the rechargeable battery (250) and operably coupling the engine (128) to the pump (122), wherein the electrical signal (108) is based on a voltage signal (110) from the rechargeable battery (250).

16. The method (400) of example 15, further comprising modulating, by the pressure sensor (106), the voltage signal (110) to form the electrical signal (108).

17. The method (400) of example 11, further comprising hydraulically coupling a hydraulic accumulator (102) to the pressure sensor (106) and the check valve (104) through the first hydraulic connector (112).

18. The method (400) of example 11, further comprising: providing an unloader valve (116) hydraulically connected to the pump (122) through the second hydraulic connector (137) and electrically coupled to the control unit (128); providing a tank (124) hydraulically connected to the unloader valve (116) through a third hydraulic connector (132) and hydraulically connected to the pump (122) through a fourth hydraulic connector (134); and closing, under control of the control unit (128), the unloader valve (116) at a second time, wherein the second time is subsequent to the first time.

19. The method (400) of example 18, further comprising causing, under control of the control unit (128), the unloader valve (116) to reduce a rate at which the unloader valve (116) transmits fluid received through the second hydraulic connector (137) to the tank (124) through the third hydraulic connector (132) over a period commencing at a third time and ending at the second time.

20. The method (400) of example 19, wherein the third time is later than the first time.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the scope of the appended claims, giving full cognizance to equivalents in all respects.

What is claimed is:

1. A system for maintaining hydraulic pressure at a hydraulic accumulator, the system comprising:
a pressure sensor electrically coupled to a control unit;
a check valve hydraulically coupled to the pressure sensor through a first hydraulic connector; and
a pump hydraulically coupled to the check valve through a second hydraulic connector and electrically coupled to the control unit;
wherein the pressure sensor is configured to mechanically detect a pressure at the first hydraulic connector;
the pressure sensor is further configured to transmit an electrical signal to the control unit when the pressure at the first hydraulic connector falls below a first threshold,
the pressure sensor is further configured to cease transmitting the electrical signal to the control unit when the pressure at the first hydraulic connector exceeds a second threshold,
the control unit is configured to control the pump to urge, at a first time, hydraulic fluid through the check valve into the first hydraulic connector through the second hydraulic connector when the control unit receives the electrical signal, and
wherein the control unit is further configured to control the pump to cease urging hydraulic fluid through the check valve into the first hydraulic connector through the second hydraulic connector when the control unit stops receiving the electrical signal.

2. The system of claim 1, wherein the second threshold is at least two thousand pounds per square inches greater than the first threshold.

3. The system of claim 1, further comprising:
an engine; and
a rechargeable battery,
wherein the engine is electrically coupled to the rechargeable battery and operably coupled to the pump, and
wherein the electrical signal is based on a voltage signal from the rechargeable battery.

4. The system of claim 3, wherein the electrical signal is a modulated signal based on the voltage signal and modulated by the pressure sensor.

5. The system of claim 1, further comprising a hydraulic accumulator hydraulically coupled to the pressure sensor and the check valve through the first hydraulic connector.

6. A system for maintaining hydraulic pressure at a hydraulic accumulator, the system comprising:
a pressure sensor electrically coupled to a control unit;
a check valve hydraulically coupled to the pressure sensor through a first hydraulic connector;
a pump hydraulically coupled to the check valve through a second hydraulic connector and electrically coupled to the control unit;
an unloader valve hydraulically connected to the pump through the second hydraulic connector and electrically coupled to the control unit; and
a tank hydraulically connected to the unloader valve through a third hydraulic connector and hydraulically connected to the pump through a fourth hydraulic connector;
wherein the pressure sensor is configured to mechanically detect a pressure at the first hydraulic connector,
the pressure sensor is further configured to transmit an electrical signal to the control unit when the pressure at the first hydraulic connector falls below a first threshold,
the control unit is configured to control the pump to urge, at a first time, hydraulic fluid through the check valve into the first hydraulic connector through the second hydraulic connector when the control unit receives the electrical signal
the control unit is further configured to close the unloader valve at a second time,
the second time is subsequent to the first time, and
wherein the control unit is further configured to control the unloader valve to reduce a rate at which the unloader valve transmits fluid received through the second hydraulic connector to the tank through the third hydraulic connector over a period commencing at a third time and ending at the second time.

7. The system of claim 6, wherein the third time is later than the first time.

8. A method for maintaining pressure in a hydraulic accumulator, the method comprising:
providing a pressure sensor electrically coupled to a control unit;
providing a check valve hydraulically coupled to the pressure sensor through a first hydraulic connector;
providing a pump hydraulically coupled to the check valve through a second hydraulic connector and electrically coupled to the control unit;
mechanically detecting, using the pressure sensor, a pressure at the first hydraulic connector;
transmitting, using the pressure sensor, an electrical signal to the control unit when the pressure at the first hydraulic connector falls below a first threshold;
receiving, by the control unit, the electrical signal;
controlling the pump, using the control unit, to urge, at a first time, hydraulic fluid through the check valve into the first hydraulic connector through the second hydraulic connector responsive to the control unit receiving the electrical signal;
ceasing, using the pressure sensor transmission of the electrical signal to the control unit when the pressure at the first hydraulic connector exceeds a second threshold; and
ceasing, by the pump, to urge hydraulic fluid through the check valve into the first hydraulic connector through the second hydraulic connector responsive the control unit detecting that the control unit has stopped receiving the electrical signal.

9. The method of claim 8, wherein the second threshold is at least two thousand pounds per square inches greater than the first threshold.

10. The method of claim 8, further comprising:
providing an engine;
providing a rechargeable battery; and
electrically coupling the engine to the rechargeable battery and operably coupling the engine to the pump,
wherein the electrical signal is based on a voltage signal from the rechargeable battery.

11. The method of claim 10, further comprising modulating, by the pressure sensor, the voltage signal to form the electrical signal.

12. The method of claim 8, further comprising hydraulically coupling a hydraulic accumulator to the pressure sensor and the check valve through the first hydraulic connector.

13. The method of claim 8, further comprising:
providing an unloader valve hydraulically connected to the pump through the second hydraulic connector and electrically coupled to the control unit;
providing a tank hydraulically connected to the unloader valve through a third hydraulic connector and hydraulically connected to the pump through a fourth hydraulic connector; and
closing, under control of the control unit, the unloader valve at a second time,
wherein the second time is subsequent to the first time.

14. The method of claim 13, further comprising causing, under control of the control unit, the unloader valve to reduce a rate at which the unloader valve transmits fluid received through the second hydraulic connector to the tank through the third hydraulic connector over a period commencing at a third time and ending at the second time.

15. The method of claim 14, wherein the third time is later than the first time.

* * * * *